(12) United States Patent
Liu (10) Patent No.: US 10,634,619 B2
(45) Date of Patent: Apr. 28, 2020

(54) DEVICE AND METHOD FOR INSPECTING DISPLAY

(71) Applicant: Wuhan China Star Optoelectronics Technology Co., Ltd., Wuhan, Hubei (CN)

(72) Inventor: Zhe Liu, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 18 days.

(21) Appl. No.: 16/120,230

(22) Filed: Sep. 1, 2018

(65) Prior Publication Data

US 2019/0137408 A1 May 9, 2019

Related U.S. Application Data

(63) Continuation of application No. PCT/CN2018/076346, filed on Feb. 11, 2018.

(30) Foreign Application Priority Data

Nov. 3, 2017 (CN) .......................... 2017 1 1070083

(51) Int. Cl.
| | |
|---|---|
| *G01N 21/88* | (2006.01) |
| *G01N 21/95* | (2006.01) |
| *G02F 1/13* | (2006.01) |

(52) U.S. Cl.
CPC ......... *G01N 21/8806* (2013.01); *G01N 21/95* (2013.01); *G01N 2021/9513* (2013.01); *G02F 1/1309* (2013.01)

(58) Field of Classification Search
CPC .............. G01N 21/88–958; G01N 2021/9513
See application file for complete search history.

(56) References Cited

U.S. PATENT DOCUMENTS

2005/0270530 A1* 12/2005 Wada .................. G03B 17/18
356/364
2008/0174771 A1* 7/2008 Yan ..................... G01N 21/8901
356/237.5
(Continued)

FOREIGN PATENT DOCUMENTS

| CN | 1721815 A | 1/2006 |
|---|---|---|
| CN | 202101755 U | 1/2012 |

(Continued)

*Primary Examiner* — Hina F Ayub
*Assistant Examiner* — Amanda Merlino
(74) *Attorney, Agent, or Firm* — Andrew C. Cheng (57) ABSTRACT

A display inspection device includes a light source, a light condenser unit, a light splitter unit, and a photoelectric converter that are arranged, in sequence, externally of a display-to-be-inspected. The light condenser unit provides constant-frequency excitement to the inspection light beam so as to make constant-frequency variation of focus of the inspection light beam. The range of variation of the focus of the inspection light beam always covers a focus point on a surface of the display-to-be-inspected so that the inspection device possess an active focusing function, allowing a surface configuration, reflectivity, or defect of the display-to-be-inspected to be reflected in variation of intensity of a reflected light beam and also allowing the focusing point of the inspection light beam not to be constrained to focus on the surface of an objected-to-be-inspected thereby greatly increasing an inspection range of the device and improving inspection efficiency.

8 Claims, 4 Drawing Sheets

(56) References Cited

U.S. PATENT DOCUMENTS

| | | | |
|---|---|---|---|
| 2012/0229618 A1* | 9/2012 | Urano | G01N 21/9501 348/92 |
| 2014/0168643 A1* | 6/2014 | Lin | G01N 21/958 356/239.3 |
| 2017/0318216 A1 | 11/2017 | Gladnick et al. | |

FOREIGN PATENT DOCUMENTS

| | | |
|---|---|---|
| CN | 103630337 A | 3/2014 |
| EP | 0777219 A1 | 6/1999 |
| JP | 2012189546 A | 10/2012 |

* cited by examiner

DEVICE AND METHOD FOR INSPECTING DISPLAY

CROSS REFERENCE TO RELATED APPLICATIONS

This application is a continuation application of PCT Patent Application No. PCT/CN2018/076346 filed on Feb. 11, 2018, which claims the priority benefit of Chinese Patent Application No. 201711070083.1 filed on Nov. 3, 2017, titled "Device and Method for Inspecting Display", which is herein incorporated by reference in its entirety.

BACKGROUND OF THE INVENTION

1. Field of the Invention

The present invention relates to the field of manufacture of liquid crystal displays, and more particularly to inspection of displays and internal structural layers.

2. The Related Arts

In a manufacturing process, it is necessary to measure or inspect characteristics of devices or patterns, such as surface microstructure contours, surface roughness, surface integrity, and surface reflectivity. Test equipment for inspection of defects of these kinds is generally classified into two types, one being contact type and the other non-contact type.

For contact type inspection, an inspection device involved is often a probe. The inspection equipment drives the probe to contact an outside surface of a display to be inspected and data detected thereby are transmitted back to a terminal to allow determination to be conducted either manually or by the inspection equipment in respect of the defects of the inspected display. Since the inspection is made in a contacting way, it is inevitable that friction exists between the probe and an inspected surface during an inspection operation and this readily causes deformation and abrasion of the display. To reduce damage caused by friction and to ensure a predetermined size of contact area to ensure effectiveness of data, it is necessary to strictly control a relative distance between the probe and the inspected display during a movement of the probe and tolerance must be strictly restricted. Consequently, a relative moving speed that could be adopted between the probe and the inspected display is very low and thus the efficiency of inspection is limited.

For non-contact type inspection, the inspection is often conducted with directed energy medium, such as light beam and sound wave. The inspection equipment drives a directed energy generator in such a way that a predetermined distance is kept with respect to a surface of the inspected display and at the same time, while directed energy medium is emitted toward the inspected display, the feedback signals of the medium generated by the surface of the inspected display are collected and managed for conversion into electrical signals with which determination can be made either manually or with the inspection equipment. In this way, the requirements for relative moving speed and relative distance between the inspection equipment and the inspected display is not so restricted as those of the contact type inspection, and allowable tolerance could be higher. However, due to the differences concerning vertical locations and structural assembly of each structural layer of a display and coupling sites among components thereof, the inspection equipment must be of high accuracy focusing in order to conduct inspection of minute patterns. In case of repeated variation of focusing, then the complexity of the inspection equipment would be increased.

SUMMARY OF THE INVENTION

An object of this application is to provide a non-contact display inspection device that realizes automatic focusing. The following technical solutions are provided.

A display inspection device comprises a light source, a light condenser unit and a light splitter unit located between the light source and a display-to-be-inspected, and a photoelectric converter; wherein the light source emits an inspection light beam, which passes, in sequence, through the light condenser unit and the light splitter unit, to project onto the display-to-be-inspected; the light condenser unit comprises a lens assembly and a vibration unit, wherein the vibration unit provides the lens assembly with constant-frequency simple harmonic vibration, so that the lens assembly varies a focusing point of the inspection light beam; the display-to-be-inspected is located within a range of variation of the focusing point; and the light splitter unit receives an inspection light beam reflected from the display-to-be-inspected and reflects the inspection light beam toward the photoelectric converter.

In the above device, the light condenser unit further comprises a power source, the power source being fixedly connected to the vibration unit to excite the vibration unit to keep amplitude and frequency of the vibration unit fixed.

In the above device, the vibration unit comprises a tuning fork and the lens assembly comprising a first vibration lens and a second vibration lens, the tuning fork having two prongs that are respectively coupled to the first vibration lens and the second vibration lens.

In the above device, the light condenser unit further comprises a floating mechanism, the floating mechanism providing connection between the vibration unit and the first and second vibration lenses to ensure the first and second vibration lenses are kept at a horizontal condition during a vibration operation.

The present invention is also related to a method for inspecting a display, which comprises the following steps:

defining a direction that is perpendicular to a plane of a display-to-be-inspected as a first direction and operating a light source to project an inspection light beam in the first direction toward the display-to-be-inspected;

providing a light condenser unit to focus the inspection light beam, wherein the light condenser unit comprises a lens assembly and a vibration unit, the vibration unit providing constant-frequency simple harmonic vibration to the lens assembly in an inspection process so that the lens assembly continuously varies a focusing point of the inspection light beam in the inspection process and ensures the display-to-be-inspected is located in a range of variation of the focusing point; and providing a light splitter unit to allow the inspection light beam to transmit therethrough, such that the inspection light beam is reflected by the display-to-be-inspected back to the light splitter unit and the light splitter unit causes second-time reflection of the inspection light beam to project toward the photoelectric converter, wherein the photoelectric converter converts an optical signal received thereby into an electric signal for analysis and determination.

In the above method, in the inspection process, the vibration unit is constantly and continuously excited to ensure amplitude and frequency of the vibration unit are kept fixed.

In the above method, an inspection operation of the display-to-be-inspected is such that after completion of each of structural layers, a full inspection is conducted for the layer.

In the above method, an inspection operation of the display-to-be-inspected is such that after completion of all of structural layers, a full inspection is conducted collectively for all of the structural layers.

In the above method, defect data obtained with inspection are classified according to characteristics thereof to establish a defect database made up of the defect data;

comparing inspection data obtained with a currently-performed inspection operation with characteristics of the defect data of the defect database and determining a defect type to which the inspection data correspond.

In the above method, a result of analysis of the inspection data of each of inspection operations is fed into the defect database and constant modification and refinement of the characteristics of the defect data of the defect database are conducted.

The present invention provides a display inspection device, in which a light source, a light condenser unit, a light splitter unit, and a photoelectric converter are arranged, in sequence, externally of a display-to-be-inspected. The light source emits an inspection light beam that passes, in sequence, through the light condenser unit and the light splitter unit to be reflected by the display-to-be-inspected. The reflected inspection light beam is acted upon by the light splitter unit for reflection of the second time to be eventually received by the photoelectric converter for conversion of a condition of a surface of the display-to-be-inspected into an electric signal for determination by an operator. The light condenser unit provides continuously affecting constant-frequency excitement to the inspection light beam to make constant-frequency variation of focus of the inspection light beam. The range of variation of the focus of the inspection light beam covers a focus point on the surface of the display-to-be-inspected so that the inspection device of the present invention possesses an active focusing function, allowing for active adaption to minute focus variation of the surface of the display-to-be-inspected to change analysis for a smooth curve conducted in a later stage into analysis of a high-frequency simple harmonic vibration curve, such that under a condition of limited increase of difficulty, the available inspection range of the inspection device can be greatly expanded, the inspection operation can be simplified, and a higher inspection efficiency can be realized compared to the known inspection measures.

DETAILED DESCRIPTION OF THE PREFERRED EMBODIMENTS

A clear and complete description will be given to the technical solutions provided by embodiments of the present invention with reference to the attached drawings of the embodiments of the present invention. However, the embodiments so described are only some, but not all, of the embodiments of the present invention. Based on the embodiment of the present invention, other embodiments are available to those having ordinary skills of the art without the expense of creative effort and endeavor and are considered belonging to the scope of protection of the present invention.

Referring to a display inspection device shown in FIGS. 1-5, in a first direction 001 that is perpendicular to a display-to-be-inspected 100, a light source 200, a light condenser unit 210, a light splitter unit 230, and a photoelectric converter 240 are arranged in sequence, wherein the light source 200 is located at a most remote location away from the display-to-be-inspected 100 and the light source 200 projects an inspection light beam 300 in the first direction 001 toward the display-to-be-inspected during an inspection process such that the inspection light beam 300, after being focused by the light condenser unit 210, passes through the light splitter unit 230 and, upon reaching a plane of the display-to-be-inspected 100, is reflected back to the light splitter unit 230. The light splitter unit 230 comprises a half-transmitting and half-reflecting beam splitter assembly such that the reflected inspection light beam 300, upon returning to the light splitter unit 230, is subjected to second time reflection and thus, a propagation path changes, no longer following the first direction 001 and becoming outward projecting. The photoelectric converter 240 receives, in the changed propagation path, the inspection light beam 300 and receives and converts an optical signal so obtained into an electric signal, allowing an inspection operator to analyze and determine surface defects of the display-to-be-inspected 100.

Figure 2:
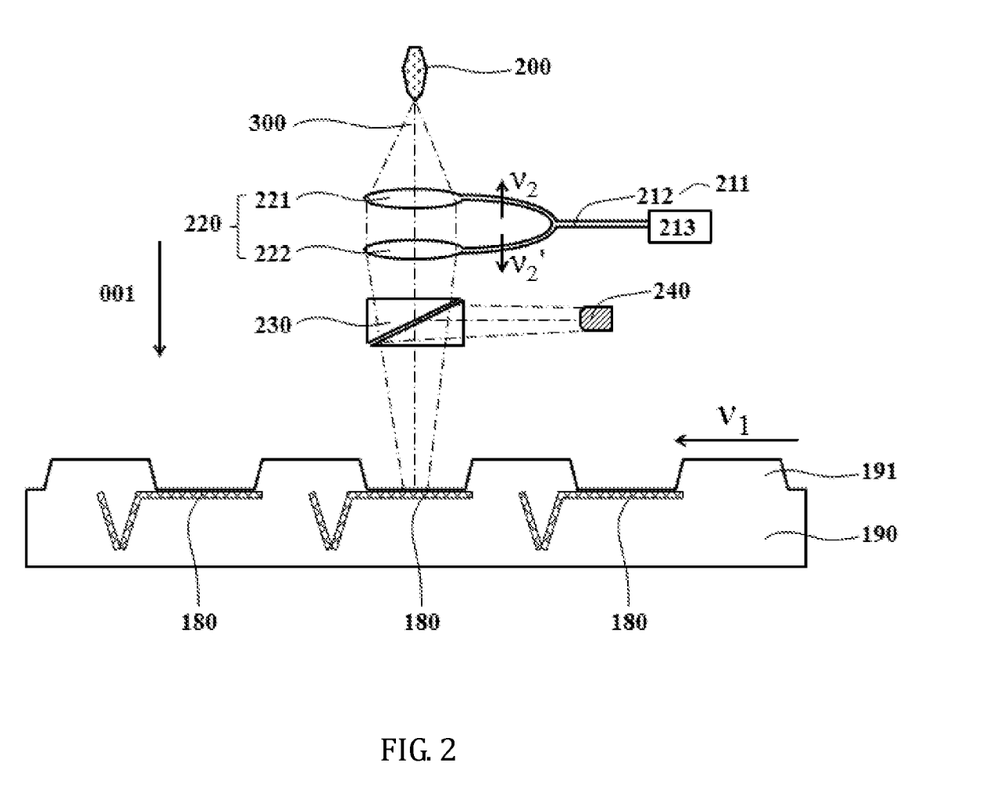
FIG. 2 is a schematic view illustrating a normal operation of the display inspection device according to the present invention.
Figure 3:
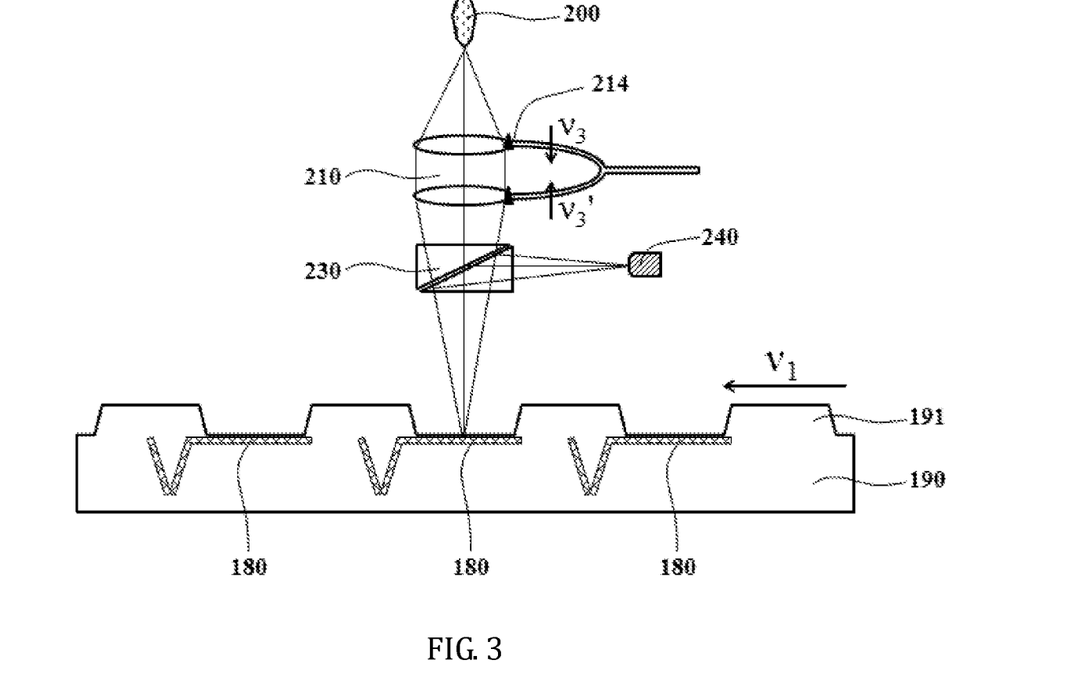
FIG. 3 is a schematic view illustrating an operation of the display inspection device according to the present invention in a correctly focusing condition.
Figure 4:
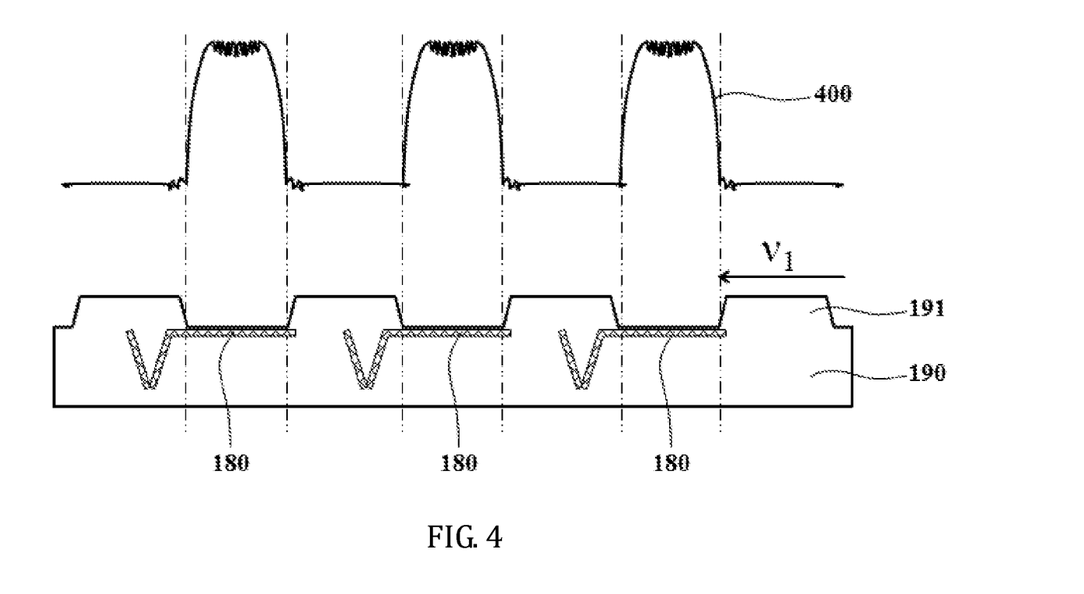
FIG. 4 is a schematic view illustrating an inspection target of the display inspection device of the present invention being a good product.
Figure 5:
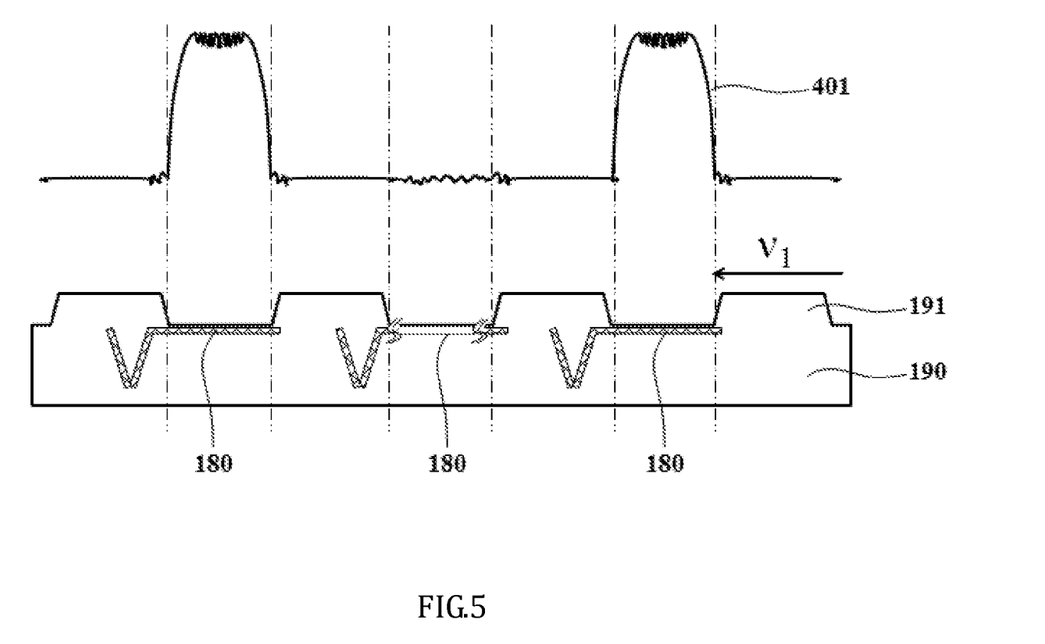
FIG. 5 is a schematic view illustrating a defect being detected by the display inspection device of the present invention.

The light condenser unit 210 that provides an effect of focusing in the inventive device comprises a lens assembly 220 and a vibration unit 211. The vibration unit 211 is coupled to at least one vibration lens 221 of the lens assembly 220 so as to provide, in the inspection process, the vibration lens 221 with constant-frequency simple harmonic vibration, whereby the lens assembly 220 is caused to make constant variation of a focusing point of the inspection light beam 300 during the inspection process. A range of variation of the focusing point is kept within a distance between the display-to-be-inspected 100 and the light condenser unit 210 in the first direction 001 in order to allow the inspection light beam 300 to form, in each vibration cycle, a focusing point on the surface of the display-to-be-inspected, making the entirety of the light beam focused or converged on the surface of the display-to-be-inspected 100, wherein under such a condition, a signal detected by the photoelectric converter 240 shows the strongest level.

In other words, the present inventive device comprises a light source 200, a light condenser unit 210 and a light splitter unit 230 located between the light source 200 and a display-to-be-inspected 100, and a photoelectric converter 240. The light source 200 issues an inspection light beam 300, and the inspection light beam 300 passes, in sequence, through the light condenser unit 210 and the light splitter unit 230, to project onto the display-to-be-inspected 100. The light condenser unit 210 comprises a lens assembly 220 and a vibration unit 211. The vibration unit 211 provides simple harmonic vibration of a constant frequency to the lens assembly 220 so that the lens assembly 220 provides a focusing point that is variable to the inspection light beam 300 and the display-to-be-inspected 100 is located in the variation range of the focus point of the inspection light beam 300. The light splitter unit 230 causes reflection, for the second time, of the inspection light beam 300 that is reflected by the display-to-be-inspected, to the photoelectric converter 240.

Figure 1:
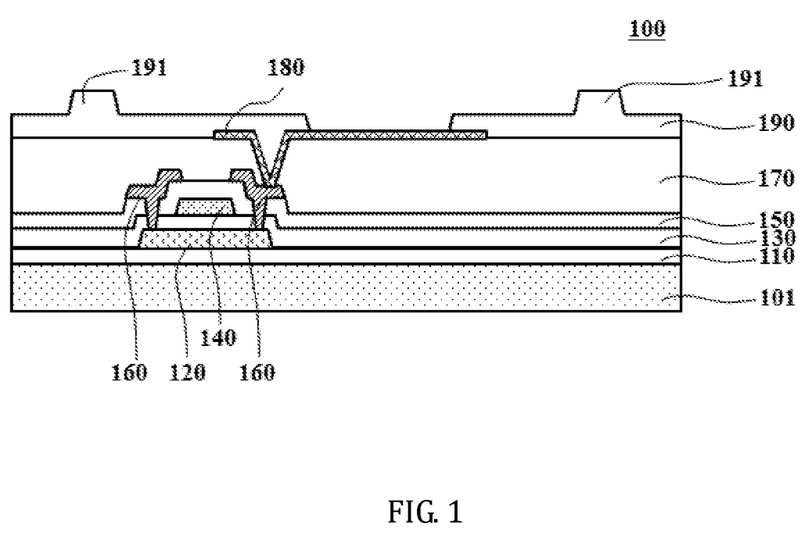
FIG. 1 is a schematic view illustrating a structure of an inspection target of a display inspection device according to the present invention.

An explanation of a process of converting the optical signal in a high-frequency simple harmonic form into an electric signal of surface mass of the display-to-be-inspected in this invention is made with reference to a "complementary thin-film transistor structure" with a known driver array substrate manufacturing process. As shown in FIG. 1, formation of structural layers, including a buffer layer 110, a semiconductor conductive channel 120, a gate dielectric layer 130, a gate electrode 140, an interlayer insulation layer 150, source and drain electrodes 160, a passivation and planarization layer 170, a pixel electrode 180, a pixel definition layer 190, and photo spacer (PS) pillars 191 are completed on a glass or flexible substrate 101. The thin-film transistor that constitutes the array substrate 101 could be one of an amorphous silicon thin-film transistor, a poly-silicon thin-film transistor, an oxide semiconductor thin-film transistor, or an organic thin-film transistor. The pixel electrode 180 is a component to be inspected as exemplified in this example. The pixel electrode 180 is often formed of a three layer structure of indium tin oxide (ITO)/silver (Ag)/indium tin oxide (ITO). After the formation of the pixel definition layer 190 and the PS pillars 191 has been completed, it needs to inspect if upper surfaces of the pixel definition zone (namely a subsequent vapor deposition zone of OLED) and the pixel electrode 180 have been damaged or contaminated, or the pixel electrode 180 itself is broken.

As shown in FIG. 2, the present inventive inspection device is set at a location above the drive array substrate 101. The drive array substrate 101 takes a consistent speed v1 to move with respect to the inspection device and inspection starts. The inspection light beam 300 emitting from the light source 200 converges on a surface of the pixel electrode 180 to be inspected. In other words, the light source 200 and the focus point of the inspection light beam 300 are located on conjugate positions for image formation. The vibration unit 211 can be a tuning fork 212. The lens assembly 220 is made up of a first vibration lens 221 and a second vibration lens 222. The tuning fork 212 is simultaneously coupled to the first vibration lens 221 and the second vibration lens 222 and provide constant-frequency excitation to the first vibration lens 221 and the second vibration lens 222 so that the first vibration lens 221 and the second vibration lens 222 are kept vibrating under such a frequency. The first vibration lens 221 and the second vibration lens 222 are kept in movement of approaching each other or away from each other, so that the focus point of the inspection light beam 300 becomes floating, in a simple harmonic manner, on the surface of the pixel electrode 180 to be inspected. The distance between the light condenser unit 210 and the drive array substrate 101 is kept fixed in the first direction 001 and within such a distance, there is always one specific position in the floating range of the focus point of the inspection light beam 300 such that the focus point of the inspection light beam 300 exactly falls on the surface of the pixel electrode 180 to be inspected to cause reflection thereof whereby the reflected inspection light beam 300 under such a condition is transmitted through the splitter 230 to project to the photoelectric converter 240, to provide a strongest level of electric signal so detected (see FIG. 3). When the surface of the pixel electrode 180 to be inspected is broken or contaminated or shows excessively high roughness, the optic signal entering the photoelectric converter 240 would deteriorate proportionally.

Obviously, when the inspection light beam 300 converges on an area other than the pixel electrode 180 to be inspected, such as converging on the organic pixel definition layer 190, the reflection light would be significantly reduced. Since the vibration frequency of the tuning fork 212 is far higher than the speed of the pixel electrode 180 to be inspected moving with respect to the present inventive inspection device, it is easy to distinguish the frequency of variation of the inspection signal caused by the movement so that it is possible to identify influences caused by an effective reflection signal of the inspection signal, vibration noise, and a reference reflection signal. FIG. 2 indicates that when the lens assembly 220 is vibrated to move to a non-focusing position, the focus point of the inspection light beam 300 is off the surface of the pixel electrode 180 to be inspected and the reflection signal shows reduction of a certain ratio with respect to the maximum level.

For a signal obtained in inspection, when the pixel electrode 180 to be inspected shows, in the entire range of inspection, excellent consistency, no apparent damage and contamination, or having reflectivity meeting requirement, an output of electric signal corresponding thereto would be stable and uniform, close to a square wave 400 (see FIG. 4), wherein the square wave 400 has an amplitude level that is directly related to a mass parameter of the pixel electrode 180 to be inspected; oppositely, when the pixel electrode 180 to be inspected shows, in the entire range of inspection (as shown in the middle portion of FIG. 5), apparent damage and contamination or having reflectivity not meeting the requirement, an output of electrical signal of inspection at the corresponding location would exhibit corresponding deterioration in the square wave 401 so displayed, wherein the amount of deterioration shows a strong relationship with the mass parameter of the pixel electrode 180. As such, the condition of the surface of the pixel electrode 180 to be inspected could be well inspected with the present inventive device.

In some embodiments, to ensure no variation of amplitude and frequency of the vibration unit 211 during the inspection process, the light condenser unit 210 is further provided with a power source 213 in the vibration unit 211. The power source 213 is fixedly connected to the vibration unit 211 to continuously excite the vibration unit 211. The power source 213 could be a device including an electric motor or a power-driven cam.

To acquire more precise result of inspection, the light condenser unit 210 is further provided with a floating mechanism 214. The floating mechanism 214 is provided for the purpose of establishing a cushioning device between the tuning fork 212 and the vibration lens 221. Since two prongs of the vibration tuning fork 212 are a cantilever arm structure, angular deviation may inevitably occur in a vibration process so as not to ensure vertical incidence of the inspection light beam 300. With the installation of the floating mechanism 214, deviation caused by vibration of the tuning fork 212 can be eliminated to thereby ensure the first vibration lens 221 and the second vibration lens 222 are parallel with respect to the pixel electrode 180 to be inspected, namely the first vibration lens 221 and the second vibration lens 222 are kept in a horizontal condition, so as to acquire more accurate inspection signals.

In one embodiment, the floating mechanism 214 may comprise a spring structure. In some other embodiments, the floating mechanism 213 could be realized with a floating bearing.

The light source 200 can a light emission device, such as a xenon lamp and a halogen lamp, or may be a laser generator. When a structural layer to be inspected requires an enlarged range of light variation, it is more suitable to use a strong laser generator in combination with an attenuator for serving as a light source for inspection, allowing for meeting, to the maximum extent, the requirement for light intensity.

In some embodiments, the vibration unit 211 may be optionally a high-frequency vibration motor or a commonly used mechanism that generates a simple harmonic motion, such as a cam, a worm gear, a screw, and a crank connection rod. This invention provides no limitation in this respect.

The target of inspection can be the intactness of a line width, a pattern structure, or a surface configuration of a metallic, semiconductor, inorganic and organic insulation layer of various display substrates or devices and a fine metal mask (FMM) for OLED vapor deposition and is not limited to the requirement of the embodiment.

The present invention is also related to a method for inspecting a display, which comprises the following steps:

defining a direction that is perpendicular to a plane of a display-to-be-inspected 100 as a first direction 001 and operating a light source 200 to project an inspection light beam 300 in the first direction 001 toward the display-to-be-inspected 100;

using a light condenser unit 200 to focus the inspection light beam 300, wherein the light condenser unit 200 comprises a lens assembly 220 and a vibration unit 211; the vibration unit 211 is coupled to the lens assembly 220 to provide, in an inspection process, the vibration lens 221 with constant-frequency simple harmonic vibration, so that the lens assembly 220 is caused to make constant variation of a focusing point of the inspection light beam 300 during the inspection process, wherein a range of variation of the focusing point is kept within a distance between the display-to-be-inspected 100 and the light condenser unit 210 in the first direction 001 in order to allow the inspection light beam 300 to form, in each vibration cycle, a focusing point on the surface of the display-to-be-inspected, making the entirety of the light beam focused or converged on the surface of the display-to-be-inspected 100, wherein a light splitter unit 230 is used to transmit the inspection light beam 300 therethrough and the inspection light beam 300 is then reflected by a surface of the display-to-be-inspected 100 back to the light splitter unit 230 to allow the inspection light beam 300 to undergo second-time reflection by the light splitter unit 230 for projection outward and a photoelectric converter 240 receives the inspection light beam 300 split from the light splitter unit 230 and converts the optical signal into an electric signal for inspection and determination.

The complete principle of the inspection process is similar to that of the above-described the inspection device of the present invention, comprising continuous excitation of the vibration unit 211 to ensure amplitude and frequency the lens assembly 220 are kept fixed during the inspection process. Repeated description will not be provided again. For the method, refinement may be made for some embodiments.

The inspection of the display-to-be-inspected 100 can be conducted, after completion of formation of each layer of structure, for complete inspection of such a layer. This allows for easy identification of the condition of surface defect of each layer or each structure, while a disadvantage is that numerous times of inspection are required, making it complicated and tedious.

Thus, in some embodiments, an option can be made to conduct, after completion of formation of all structural layers, full inspection of all the structural layer of the display-to-be-inspected 100 for one time operation. Since structural layers of different materials may show different spectra when encountering incidence of light, it is possible to analyze and determine, in case a defect is identified in the display-to-be-inspected 100, the specific location of defect is on which layer according to variation of spectrum received by the photoelectric converter 240. This, although increasing the difficulty of analysis, reduces the number of inspections that must be made and increases the efficiency of inspection.

In some embodiments, an inspection operator may make classification according to data of defects after the inspection in order to establish a defect database made up of the data of the defects. In this way, in each inspection process, the data of inspection obtained with an inspection operation can be compared with the characteristics of the defect data included in the defect database so that it is possible to determine a defect type to which the inspection data of the display-to-be-inspected 100 of this inspection operation corresponds and realize the surface mass condition of the display-to-be-inspected 100 in this inspection operation.

After the acquirement of the inspection data of every operation of inspection, the inspection data of a currently-performed inspection operation can be then fed into the defect database in order to constantly expand the sample number of the defect database. When the sample number reaches a predetermined number, the characteristics of the defect data of the defect database could be subjected to modification and refinement to provide more accurate result of inspection.

The present invention provides a display inspection device, in which a light source 200, a light condenser unit 210, a light splitter unit 230, and a photoelectric converter 240 are arranged, in sequence, externally of a display-to-be-inspected 100. The light source 200 emits an inspection light beam 300 that passes, in sequence, through the light condenser unit 210 and the light splitter unit 230 to be reflected by the display-to-be-inspected 100 to be received, after being reflected for the second time by the light splitter unit 230, by the photoelectric converter 240. The light condenser unit 210 causes continuously affecting constant-frequency excitement on the inspection light beam 300 to make constant-frequency variation of focus of the inspection light beam 300 on the display-to-be-inspected during the inspection process so as to provide a function of active focusing for the present inventive inspection device, allowing for active adaption to minute focus variation on the surface of the display-to-be-inspected 100 to change analysis for a smooth curve conducted in a later stage into analysis of a high-frequency simple harmonic vibration curve, such that under a condition of limited increase of difficulty, the available inspection range of the inspection device can be greatly expanded, the inspection operation can be simplified, and a higher inspection efficiency can be realized, compared to the known inspection measures.

An inspection method adopting the present inventive device can achieve an effect of making inspection in one single process and may allow for collective inspection to be made with spectrum difference after all or some of the manufacturing processes have been done to thereby further increase the inspection efficiency. With introduction of a defect database, bettering can be achieved as compared to manual determination performed before, allowing a terminal device to assist or directly replace manual operation of determination of defect, whereby the throughput could be greatly improved as compared to the known inspection methods.

The embodiments provided above are not regarded as limiting to the protection scope that the technical solution is seeking for. Any modification, equivalent substitute, and improvement made within the spirit and principle of the above-described embodiments are considered covered by the protection scope of the technical solution.

What is claimed is:

1. A display inspection device, comprising a light source, a light condenser unit and a light splitter unit located between the light source and a display-to-be-inspected, and a photoelectric converter;
   wherein the light source emits an inspection light beam, which passes, in sequence, through the light condenser unit and the light splitter unit, to project onto the display-to-be-inspected;
   the light condenser unit comprises a lens assembly and a vibration unit, wherein the vibration unit provides the lens assembly with constant-frequency simple harmonic vibration, so that the lens assembly varies a focusing point of the inspection light beam;
   the display-to-be-inspected is located within a range of variation of the focusing point; and
   the light splitter unit receives an inspection light beam reflected from the display-to-be-inspected and reflects the inspection light beam toward the photoelectric converter;
   wherein the vibration unit comprises a tuning fork and the lens assembly comprises a first vibration lens and a second vibration lens, the tuning fork having two prongs that are respectively coupled to the first vibration lens and the second vibration lens; and
   wherein the light condenser unit further comprises a floating mechanism, the floating mechanism providing connection between the vibration unit and the first and second vibration lenses to ensure the first and second vibration lenses are kept at a horizontal condition during a vibration operation.

2. The display inspection device according to claim 1, wherein the light condenser unit further comprises a power source, the power source being fixedly connected to the vibration unit to excite the vibration unit to keep amplitude and frequency of the vibration unit fixed.

3. A method for inspecting a display, comprising the following steps:
   defining a direction that is perpendicular to a plane of a display-to-be-inspected as a first direction and operating a light source to project an inspection light beam in the first direction toward the display-to-be-inspected;
   providing a light condenser unit to focus the inspection light beam, wherein the light condenser unit comprises a lens assembly and a vibration unit, the vibration unit providing constant-frequency simple harmonic vibration to the lens assembly in an inspection process so that the lens assembly continuously varies a focusing point of the inspection light beam in the inspection process and ensures the display-to-be-inspected is located in a range of variation of the focusing point; and
   providing a light splitter unit to allow the inspection light beam to transmit therethrough, such that the inspection light beam is reflected by the display-to-be-inspected back to the light splitter unit and the light splitter unit causes second-time reflection of the inspection light beam to project toward the photoelectric converter, wherein the photoelectric converter converts an optical signal received thereby into an electric signal for analysis and determination;
   wherein the vibration unit comprises a tuning fork and the lens assembly comprises a first vibration lens and a second vibration lens, the tuning fork having two prongs that are respectively coupled to the first vibration lens and the second vibration lens; and
   wherein the light condenser unit further comprises a floating mechanism, the floating mechanism providing connection between the vibration unit and the first and second vibration lenses to ensure the first and second vibration lenses are kept at a horizontal condition during a vibration operation.

4. The method for inspecting a display according to claim 3, wherein in the inspection process, the vibration unit is constantly and continuously excited to ensure amplitude and frequency of the vibration unit are kept fixed.

5. The method for inspecting a display according to claim 3, wherein an inspection operation of the display-to-be-inspected is such that after completion of each of structural layers, a full inspection is conducted for the layer.

6. The method for inspecting a display according to claim 3, wherein an inspection operation of the display-to-be-inspected is such that after completion of all of structural layers, a full inspection is conducted collectively for all of the structural layers.

7. The method for inspecting a display according to claim 3, wherein defect data obtained with inspection are classified according to characteristics thereof to establish a defect database made up of the defect data;
   comparing inspection data obtained with a currently-performed inspection operation with characteristics of the defect data of the defect database and determining a defect type to which the inspection data correspond.

8. The method for inspecting a display according to claim 7, wherein a result of analysis of the inspection data of each of inspection operations is fed into the defect database and constant modification and refinement of the characteristics of the defect data of the defect database are conducted.

* * * * *